(12) United States Patent
Ornes et al.

(10) Patent No.: US 12,542,877 B1
(45) Date of Patent: Feb. 3, 2026

(54) IMAGE SIGNAL PROCESSOR MOTION DETECTOR

(71) Applicant: Amazon Technologies, Inc., Seattle, WA (US)

(72) Inventors: Matthew Ornes, Andover, MA (US); Frederick Roland Carter, Salem, NH (US); Ahming Diana Prentice, Wellesley, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 642 days.

(21) Appl. No.: 17/954,058

(22) Filed: Sep. 27, 2022

(51) Int. Cl.
  H04N 19/82 (2014.01)
  H04N 7/18 (2006.01)
  G06V 10/44 (2022.01)
  H04N 5/14 (2006.01)

(52) U.S. Cl.
  CPC .......... *H04N 7/188* (2013.01); *G06V 10/443* (2022.01); *H04N 5/144* (2013.01)

(58) Field of Classification Search
  CPC ....... H04N 7/188; H04N 5/144; G06V 10/443
  See application file for complete search history.

(56) References Cited

U.S. PATENT DOCUMENTS

| | | | | |
|---|---|---|---|---|
| 2007/0140336 A1* | 6/2007 | Karube | .................. | H04N 19/14 375/E7.258 |
| 2009/0161010 A1* | 6/2009 | Tran | ...................... | H04N 7/014 348/E7.003 |
| 2012/0081385 A1* | 4/2012 | Cote | .................... | G06V 40/162 345/589 |
| 2014/0355861 A1* | 12/2014 | Nirenberg | ................ | G06T 9/00 382/133 |
| 2020/0351417 A1* | 11/2020 | Hanwell | ................ | H04N 23/45 |

* cited by examiner

*Primary Examiner* — Patrick E Demosky
(74) *Attorney, Agent, or Firm* — K&L Gates LLP

(57) ABSTRACT

Systems and techniques are described for image signal processor motion detection. In various examples, first image data including pixel values may be generated, where each pixel value is associated with a respective color tag of a color filter array. A first set of the pixel values corresponding to a first block may be determined. A second set of pixel values may be determined based on a respective pixel value of the first set and the respective color tag associated with that respective pixel value. A first intensity value associated with the first block may be determined based on the second set of pixel values. A second intensity value associated with a reference block may be determined. A comparison value representing a difference between the first intensity value and the second intensity value may be determined. A signal indicating detected motion may be sent based on the comparison value.

24 Claims, 7 Drawing Sheets

IMAGE SIGNAL PROCESSOR MOTION DETECTOR

BACKGROUND

Security systems may use one or more cameras to capture video data of areas of interest. For example, video security cameras may be positioned so as to surveil an entryway into a secure area such as a bank vault or an entrance to a private residence. Security camera systems sometimes use motion detection to initiate video capture and/or video streaming to one or more other devices. For example, upon detection of motion in video data, a camera may be configured to capture and send a live feed of video from the camera to a cloud-based server system, a central computing device, and/or to a mobile application executing on a mobile phone. In other examples, upon detection of motion in video data, a camera may begin storing captured video data in a data storage repository. In various examples, cameras may include infrared light sources in order to capture image data and/or video data in low light conditions.

DETAILED DESCRIPTION

Figure 1:
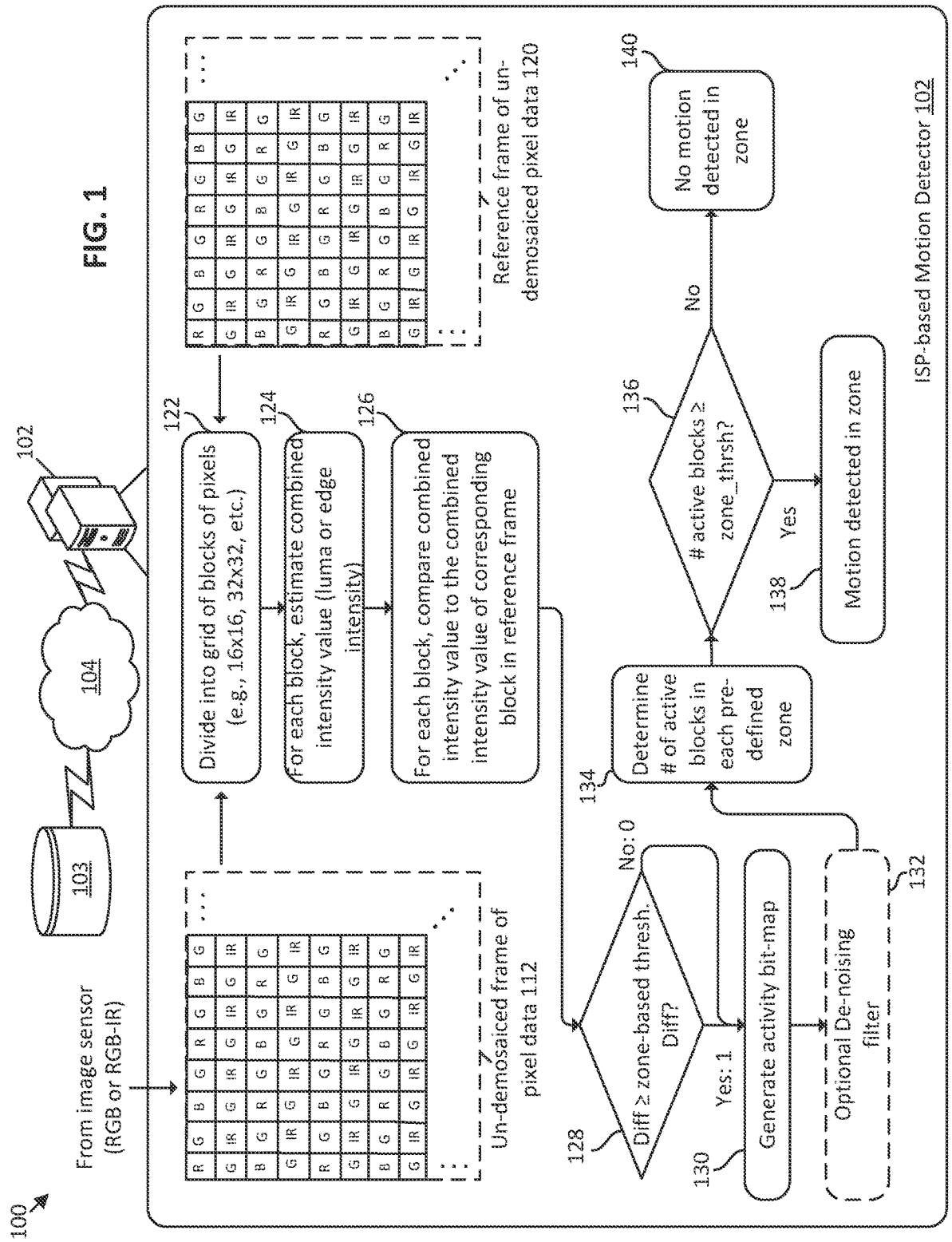
FIG. 1 is a diagram illustrating techniques for an image signal processor-based motion detector, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices of a security system or other type of camera system. In various examples, camera devices may be battery-powered for ease of installation and to avoid unsightly power cords. In various other examples, camera devices may be powered through a wired interface (e.g., through "mains" power from a wall socket). In at least some examples, camera devices may include motion sensors to detect motion. In some examples, upon detection of motion, a camera device may begin capturing and/or streaming video to one or more other devices (e.g., a video processing device) for storage, display, and/or processing. Advantageously, waiting until motion is detected prior to capturing and/or streaming image data and/or video data may prolong battery life (and minimize power consumption) by capturing video only when movement is detected. In many cases, and particularly in a surveillance context, video segments that do not depict movement and/or which represent trivial movement (e.g., leaves blowing in the wind) may not be of sufficient interest to a user of the camera system to warrant continuous video capture and/or streaming, particularly given that continuous video capture results in a quicker consumption of battery power and more frequent battery replacement. In various examples, video data may refer to one or more sequential frames of image data.

In some examples, insignificant motion may trigger a motion sensor of a camera device, which may, in turn, cause the camera device to begin capturing and/or streaming video even though the video may not be of interest to a user. Accordingly, it may be beneficial to limit the number of such "false positives" where insignificant motion results in video capture and/or streaming, which, in turn, may lead to increased power consumption and depletion of battery power. For example, an outdoor camera device may include a motion sensor with a "field-of-view" (e.g., the area monitored by the motion sensor) that includes a tree outside of a user's home. In the example, the motion sensor may be triggered each time that the wind blows and the leaves of the tree are rustled. The triggering of the motion sensor may, in turn, cause the camera device to capture and/or stream video. In another example, a motion sensor may be triggered each time a pet moves within the field-of-view (FOV) of the motion sensor. In another example, a motion sensor may be triggered by cloud movement and sunlight changes due to passing clouds. Various systems and techniques described herein may be effective to prevent triggering of video capture and/or streaming due to inconsequential motion that is not likely to be of interest to a user.

In various examples, camera devices may include and/or be configured in communication with passive infrared (PIR) sensors effective to detect motion in an environment monitored by the PIR sensor and/or by the camera devices. PIR sensors detect infrared (IR) radiation emitted by objects within the PIR sensors' fields-of-view. In some examples, the PIR sensors may be referred to herein as "PIR motion detectors" and "PIR motion sensors". In various examples, a PIR sensor may be effective to determine when an object passes through a PIR sensor's field-of-view by determining differential changes in the IR detected by the PIR sensor. PIR sensors often include two sensor "halves" and/or multiple sensor regions. A multi-facet lens breaks light received from a scene into multiple regions and projects these regions on to the different halves or regions of the sensor. The sensor integrates the black body radiation detected in the two halves (or in the multiple regions, depending on the sensor) and determines the differential change. The differential change is the difference in detected radiation between the two sensor halves (or between the different regions). If the differential changes caused by an IR-radiating object entering the field-of-view (resulting in a positive differential change in detected IR) and/or leaving the field-of-view (resulting in a negative differential change in detected IR) of the PIR sensor are above a threshold value (typically a tunable threshold referred to as the "sensitivity" of the PIR sensor), the PIR sensor may output a signal indicating that motion has been detected. PIR sensors may be passive in the sense that they may not include any IR light source and may detect radiation emitted from objects within the sensor's field-of-view without subjecting such objects to IR light projected by a light source of the sensor. Accordingly, PIR sensors consume relatively little power when in use.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g. infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

A passive infrared sensor may be analog, with an analog signal output, or may be digital, with digital data output generated utilizing an analog-to-digital converter (ADC).

An electronic device may include one or more passive infrared sensors that the electronic device uses to detect objects. Each passive infrared sensor may output a signal or sensor data, where the electronic device uses a characteristic determined using the signal or sensor data to determine whether the passive infrared sensor detected an object. The characteristic may include a voltage represented by the signal or sensor data, an amplitude of a wave generated or determined using the signal or sensor data, an angle of a wave generated using the signal or sensor data, and/or the like.

For example, a first passive infrared sensor may have a first field-of-view (FOV) that extends a first distance from the electronic device. In some examples, the first FOV is created based on placing the first passive infrared sensor in a first direction and/or using one or more lenses (which may be a lens of the passive infrared sensor or which may be used in addition to or in replacement of a lens of the passive infrared sensor).

The electronic device may include one or more lenses configured to direct light received at various first portions of the one or more lenses onto a passive infrared sensor. The one or more lenses may comprise one or more Fresnel lenses having one or more features configured to direct light.

In some example systems, if motion is detected in an environment monitored by a motion sensor such as a PIR sensor, the triggered motion sensor may send a signal to one or more camera devices associated with the motion sensor. The signal may be effective to cause the camera device(s) to begin capturing image data and/or video data. For example, a PIR sensor and a camera device may be situated in a particular room of a building. If the PIR sensor is triggered (e.g., due to a human walking through the room), the PIR sensor may send a signal to the camera device indicating that motion has been detected by the PIR sensor. In response to receipt of the signal from the PIR sensor, the camera may be configured to begin capturing video.

However, the triggering of PIR sensor (e.g., a PIR sensor detecting a motion event) may rely on tunable thresholds (e.g., a threshold magnitude of differential change between the halves of a PIR sensor). If such thresholds are set too high, motion events of interest may be missed without the camera being triggered. Conversely, if such thresholds are set too low, insignificant motion events (e.g., leaves blowing in the wind, raindrops, etc.) may cause the camera device to be triggered, resulting in the camera capturing video of events that are unlikely to be of interest to the user and potentially causing information fatigue (where the user is unlikely to pay attention to video feeds from the camera due to a large number of false positives).

Accordingly, described herein are image signal processor (ISP) based motion detection systems and techniques that may be used to detect motion within a scene (e.g., within the field-of-view of a camera device). The ISP-based motion detection systems and techniques described herein may be used to corroborate motion detection events detected by PIR sensors and/or may be used separately from PIR or other auxiliary motion detection systems. In various examples, the motion detection system described herein may be integrated into a system on chip (SoC) image signal processor and may detect motion in an image frame prior to performing color filter array (CFA) interpolation (sometimes referred to as "demosaicing") in order to reduce power consumption and compute requirements. In some examples, a machine learning-based object detector may also be used to further corroborate motion detection events and/or reduce video streaming for insignificant events. For example, a neural network-based object detector may process the particular portions of the frame in which motion has been detected by the ISP-based motion detection system in order to determine if any objects of a predefined class are detected there. If such objects (e.g., objects of interest such as a human, a vehicle, an animal, etc.) are present video streaming may be activated and the camera device may begin sending video data to one or more remote devices and a user may be alerted to the motion detection event (e.g., via a companion application executed by a mobile device).

In various examples, camera devices described may include a wireless and/or a wired transmitter and may send the captured video (e.g., may "stream" the video) to one or more other devices for playback, processing, and/or storage. For example, the camera device may stream the video to a mobile device of a user associated with the building and/or the room of the building. In some other examples, the camera device may send the video to a central processing device that may be effective to take one or more actions such as storing the video data in one or more memories, processing the video data, sending the video data to one or more other devices, and/or sending an indication or alert indicating that motion has been detected in the environment monitored by the camera device and/or providing optional access to video captured by the camera device. In various examples, the central processing device may be located within the same building or grouping of buildings as the camera device(s); however, in some other examples, the central processing device may be remotely located from the camera device(s) and may communicate with the camera device(s) over a wide area network (WAN) such as the Internet.

In at least some examples, the PIR sensor(s) and/or the camera device(s) may be battery powered. However, in some examples, the PIR sensor(s) and/or the camera device(s) may be battery powered and/or powered using a wired connection to a power source (e.g., a wall socket). In various examples, a central processing device (or multiple central processing devices) may be effective to communicate with the camera device(s) using a wired and/or wireless connection. For example, the central processing device may communicate with the camera device(s) using a wireless network such as a WLAN via the 900 MHz band. In some examples, the central processing device and/or the camera devices may be effective to receive user requests (e.g., from a user mobile device and/or from a companion application on a user mobile device) to access image data and/or video data that is accessible via the central processing device and/or to cause one or more camera devices to begin capturing and/or streaming video. For example, the central processing device may receive a request from a mobile device (e.g., a mobile device authenticated to the central processing device) for particular video data captured by a particular camera device at a particular time. In the example, the central processing device may stream the video to the authenticated mobile device. In some other examples, an authenticated mobile device may request a live video feed from one or more camera device(s). In the example, the central processing device may be effective to control the relevant camera device(s) to begin capturing video data. The central processing device may be effective to have the relevant camera device(s) stream the video data to the requesting mobile device. In other embodiments, the relevant camera device(s) may send the video data to the central processing device which may, in turn, stream the video to the requesting mobile device (after video processing, for example). In at least some examples, the central processing device may be powered by a wired connection to a wall outlet or other power source. In other examples, an authenticated mobile device may communicate directly with the one or more camera devices.

In digital cameras such as at least some of the camera devices described herein, light is focused by one or more lenses (or other optical elements) onto an array of photosensors in an image sensor with each photosensor corresponding to a pixel. The photosensors convert the incoming light (photons) into electrical signals that can be stored, analyzed, and/or used to generate an image on a display. Different photosensors (e.g., those made by different manufacturers) exhibit different spectral sensitivities to different wavelengths of light. The photosensors of an image sensor are typically arranged in a grid (e.g., a two-dimensional pattern) with photosensors arranged in rows of aligned photosensors and columns of aligned photosensors. Each photosensor corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture. Image sensors are solid state devices. Examples of different types of image sensors include charged couple device (CCD) sensors and complementary metal-oxide semiconductor (CMOS) sensors. In general, a frame of image data refers to any set of image data values that may be considered together for some purpose. For example, each photosensor/pixel of an image sensor may capture individual pixel information. The pixel information may be considered as a group when arranged into a frame of a two-dimensional grid. Each position in the grid may be referred to as a "pixel" and each pixel may be associated with a pixel value that represents the intensity of light captured by the photosensor that corresponds to the pixel. Accordingly, in some examples, a pixel may be represented as a two-dimensional coordinate.

Color filter arrays (CFAs), which are comprised of a mosaic of color filters, are placed over the pixel sensors of the image sensor to capture a mosaic of color information. However, in a typical CFA implementation, any given pixel has color information for only a single color (corresponding to the color filter associated with that pixel in the CFA). CFA interpolation techniques (e.g., "demosaicing") interpolate color information from surrounding pixels to determine a full color image from the incomplete color information output by the image sensor overlaid with the CFA. Demosaicing is typically performed by an image signal processor which may either be included in the digital camera device or may be located remotely.

As previously described, the photosensors detect light intensity but, without more, are unable to differentitate between the intensity information for different wavelengths of light. Accordingly, the photosensors are not able to generate color information from the received light. CF As include color filters that only allow certain wavelengths of light to pass. A CFA includes a pattern of such color filters where each pixel of the photosensor array corresponds to a single color filter from the CFA. Accordingly, each photosensor receives light that corresponds to a particular color. CFA patterns have been developed to allow for interpolation from surrounding pixels in order to determine color information for all relevant "missing" color channels.

For example, a photosensor may be overlaid with a light filter in the CFA that allows light of wavelengths between approximately 625-740 nanometers (nm) to pass. The pixel corresponding to this photosensor may be referred to as a "red pixel" as this is the approximate wavelength range of red light. Similarly, a pixel associated with a photosensor that is overlaid with a light filter in the CFA that allows light of wavelengths between approximately 435-500 nm to pass may be referred to as a "blue pixel" and a pixel associated with a photosensor that is overlaid with a filter in the CFA that allows light of wavelengths between approximately 520-565 nm to pass may be referred to as a "green pixel." In some examples described herein, photosensors that are sensitive to light in the near infrared range (NIR) may be used. Accordingly, the CFA for such image sensors may include NIR (sometimes referred to herein as "IR") filters that allow light of wavelengths in the infrared range to pass (e.g., from approximately 780-1100 nm). A pixel associated with a photosensor that is overlaid with a filter in the CFA that allows light of wavelengths between approximately 780-1100 nm to pass may be referred to as an "IR pixel" or an "infrared pixel."

Demosaicing refers to an algorithm that may be implemented by an image signal processor that determines the "missing" values for each pixel based on nearby pixels in the frame (e.g., using interpolation). For example, demosaicing may be used to determine the red, blue, and infrared values for a given "green" pixel. After demosaicing, each pixel has a full complement of color values (e.g., red, green, blue, and IR if an infrared photosensor is used).

For example, a simple demosaicing algorithm may interpolate the color value of the pixels of the same color in the neighborhood. For example, once the image sensor chip has been exposed to an image, the value of each pixel can be read. A pixel with a green filter provides an exact measurement of the green component. The red and blue components for this pixel may be obtained from the neighbors. For example, for a green pixel, two red pixel neighbors can be interpolated to yield the red value, and two blue pixels can be interpolated to yield the blue value. Other, more sophisticated demosaicing approaches may be used to account for changing colors, irregular gradients, abrupt changes in color or brightness (such as along sharp edges or visual transitions in the image), etc.

In some examples described herein, the ISP-based motion detection systems and techniques may detect motion from pixel information prior to performing demosaicing. This may be advantageous as pixels may be represented using fewer bits prior to demosaicing. Generally, this is because, prior to demosaicing, only a single channel of color information is provided per pixel. Accordingly, any operations performed on such pixels is "cheaper" in terms of compute resources relative to processing pixels with full 3-channel (RGB) or 4-channel (RGB-IR) color information. Accordingly, such processing may be performed with lower latency while consuming less power relative to performing the same steps post demosaicing.

FIG. 1 is a block diagram of a system 100 including an image signal processor (ISP) based motion detector 102 and one or more non-transitory computer-readable memories 103, arranged in accordance with various aspects of the present disclosure. In various examples, the computing device(s) implementing ISP-based motion detector 102 may be configured in communication over a network 104. In some examples, ISP-based motion detector 102 may be implemented in an ISP of a device (e.g., a camera device) or may be located remotely with respect to a camera device (e.g., in the one or more remote computing devices). For example, one or more of the techniques used by the ISP-based motion detector 102 may be performed using an application specific integrated circuit (ASIC) and/or using a field programmable gate array (FPGA). Network 104 may be a communication network such as a local area network (LAN), a wide area network (such as the Internet), or some combination thereof. The one or more computing devices implementing the ISP-based motion detector 102 may communicate with non-transitory computer-readable memory 103 (e.g., either locally or over network 104). The non-transitory computer-readable memories 103 may store instructions that may be effective to perform one or more of the various techniques described herein.

An image sensor may capture a frame of image data which may be a frame of RGB pixel values or RGB-IR pixel values depending on the color filter array used by the particular image sensor. In the example shown in FIG. 1, an RGB-IR color filter array is shown. Accordingly, the photosensors of the image sensor generate input values for each pixel of the frame (e.g., un-demosaiced frame of pixel data 112). In various examples, a camera device including an image sensor (not shown in FIG. 1) may continuously (or periodically) capture image data (e.g., frames of image data) for motion detection. In some examples, a reference frame of image data may be captured and stored at a certain cadence for comparison with a current frame for motion detection (as described below).

As the current frame (e.g., un-demosaiced frame of pixel data 112) is input into the ISP-based motion detector 102, each pixel may be tagged with a color type (e.g., a color tag indicating a color corresponding to the pixel's position on the color filter array (and a respective color filter of that color filter array)). For example, each pixel may be tagged as a red pixel, a green pixel, a blue pixel, or an infrared pixel (in an RGB-IR filter array). Additionally, each pixel may be associated with an input value which represents a magnitude of the light received by that pixel. For example, a 12-bit light intensity value or a 14-bit edge intensity value may be received (e.g., as determined using Laplacian edge detection, Sobel edge detection, or any other desired technique). A light intensity value represents the intensity of light (e.g., the magnitude) detected by the relevant individual pixel of the image sensor. An edge intensity value (e.g. a Laplacian edge value) may be a two-dimensional measure of two orthogonal directions and may represent the second spatial derivative of the image. The Laplacian of the image highlights regions of rapid intensity change and therefore detects "edges" in the image. The intensity values referred to herein may represent either edge values (such as Laplacian or Sobel edge values) or pixel light intensities (e.g., an input pixel value multiplied by the relevant color channel gain). In addition to edge values or pixel light intensity values, other values may be used. For example, a second order derivative may provide change in gradient values which may also be used in accordance with the techniques described herein.

A lookup table may be used to lookup a per-color channel gain value for each pixel depending on its index in the color filter array (and/or based on the respective color tag (e.g., RGB/IR) associated with the respective pixel). In other words, there may be respective red, green, and blue gain values (or red, blue, green, and infrared gain values in an RGB-IR implementation). The pixel intensity may then be multiplied by the relevant gain to generate the scaled source value (e.g., an adjusted pixel value). These scaled source values are examples of the "intensity values" referred to herein. Accordingly, after applying the per-color channel gains, each pixel is associated with a respective intensity value. Accordingly, each pixel of the un-demosaiced frame of pixel data 112 and the reference frame of un-demosaiced pixel data 120 may comprise a single intensity value for each pixel. Alternatively, Laplacian edge values may be used to represent a block's intensity. Laplacian edge values may, in some examples, be calculated using only the green pixels of a block. The Laplacian edge values associated with a block of pixels (calculated using the green pixels of a block) may be averaged and/or summed to determine the per-block intensity values.

The pixels of the un-demosaiced frame of pixel data 112 may be logically grouped into a plurality of blocks of pixels (e.g., 16×16 pixel blocks, 32×32 pixel blocks, 64×64 pixel blocks, etc.) at action 122. Each of these blocks may be a group of contiguous pixels from the input frame. The reference frame of un-demosaiced pixel data 120 may also be separated into the plurality of blocks of pixels of the same dimensions and at the same relative positions within the frame as the input frame (e.g., un-demosaiced frame of pixel data 112).

At action 124, a combined intensity value may be determined for each block of the un-demosaiced frame of pixel data 112. For example, a sum or average of the individual pixel intensity values (or Laplacian edge values) may be determined. In some examples, this combined intensity value may be considered an estimate of the luma of the block (or an estimate of the edges detected in the block) or an estimate of the edge values detected in the block, depending on the implementation. The per-block intensity value may be determined in hardware and the resulting per-block combined intensity value may be stored in memory. Additionally, a combined intensity value may be determined for each block of the reference frame of un-demosaiced pixel data 120 at action 124 (or previously). In various examples, instead of storing the reference frame image data in memory, an array of the combined intensity values (e.g., the per-block intensity values whether calculated as estimated luma values or as Laplacian edge values) may be stored to reduce memory requirements of storing the reference frame data.

The combined intensity value may be stored in memory in association with an index for the relevant block (e.g., an index representing the block's position within the frame). In various examples, a block may also be associated with a particular activity zone. An activity zone may be a user-defined zone within the image frame that is to be monitored for motion or that is to be ignored for purposes of motion detection. In various examples, a user may select one or more activity zones by selecting an enclosed area of an image (e.g., through a graphical user interface of a companion application to a camera device implementing the ISP-based motion detector 102).

As previously described, detecting motion using pre-demosaiced pixel information (including determined edge values and/or gradient change values) may reduce the compute load as the computations may be performed for only a single channel per-pixel (as opposed to using 3-channel (RGB) or 4-channel (RGB-IR) pixel information in the calculations. Accordingly, the motion detection techniques described herein may be performed with lower latency while consuming less power relative to performing the same steps post demosaicing.

Figure 2:
FIG. 2 depicts a frame of image data divided into blocks and zones that may be used for image signal processor-based motion detection, in accordance with various embodiments of the present disclosure.

For example, FIG. 2 illustrates a frame 200 of image data that has been divided into an M×N grid of blocks. Each block (e.g., Block 1.1, 1.2, . . . , M.N) may represent a group of contiguous un-demosaiced pixels with respective intensity values. For each block, the intensity values may be combined (e.g., summed or averaged) to generate a combined intensity value for the block. Additionally, each block may be associated with one or more activity zones. In the example frame 200, bold-dashed lines show a group of blocks that have been grouped together as activity zone 1. Activity zone 1 may be, for example, a part of a scene captured by a camera that the user would like to monitor for motion (e.g., a walkway, driveway, backdoor, etc.) or may be a part of a scene that the user would like to ignore for purposes of motion detection (e.g., a tree, a street, a public walkway, etc.). Although in the example frame 200, the blocks of zone 1 are contiguous, the activity zone need not be composed of contiguous blocks. For example, different trees in a scene represented in the frame by non-contiguous blocks may all be designated as the same activity zone so that they can be ignored for motion detection purposes.

Returning to FIG. 1, at action 126, for each block, the combined intensity value may be compared to the combined intensity value of the corresponding block in the reference frame. The corresponding block may be the block in the reference frame (e.g., reference frame of un-demosaiced pixel data 120) that is at the same x, y coordinate (or other block index) in the frame. For example, the top leftmost block in un-demosaiced frame of pixel data 112 may be compared to the top leftmost block in the reference frame of un-demosaiced pixel data 120.

The per-block comparison at action 126 may involve determining a comparison value representing difference in the combined intensity values (or edge values, etc.) of the current frame (e.g., un-demosaiced frame of pixel data 112) and the reference frame (e.g., reference frame of un-demosaiced pixel data 120).

Figure 3:
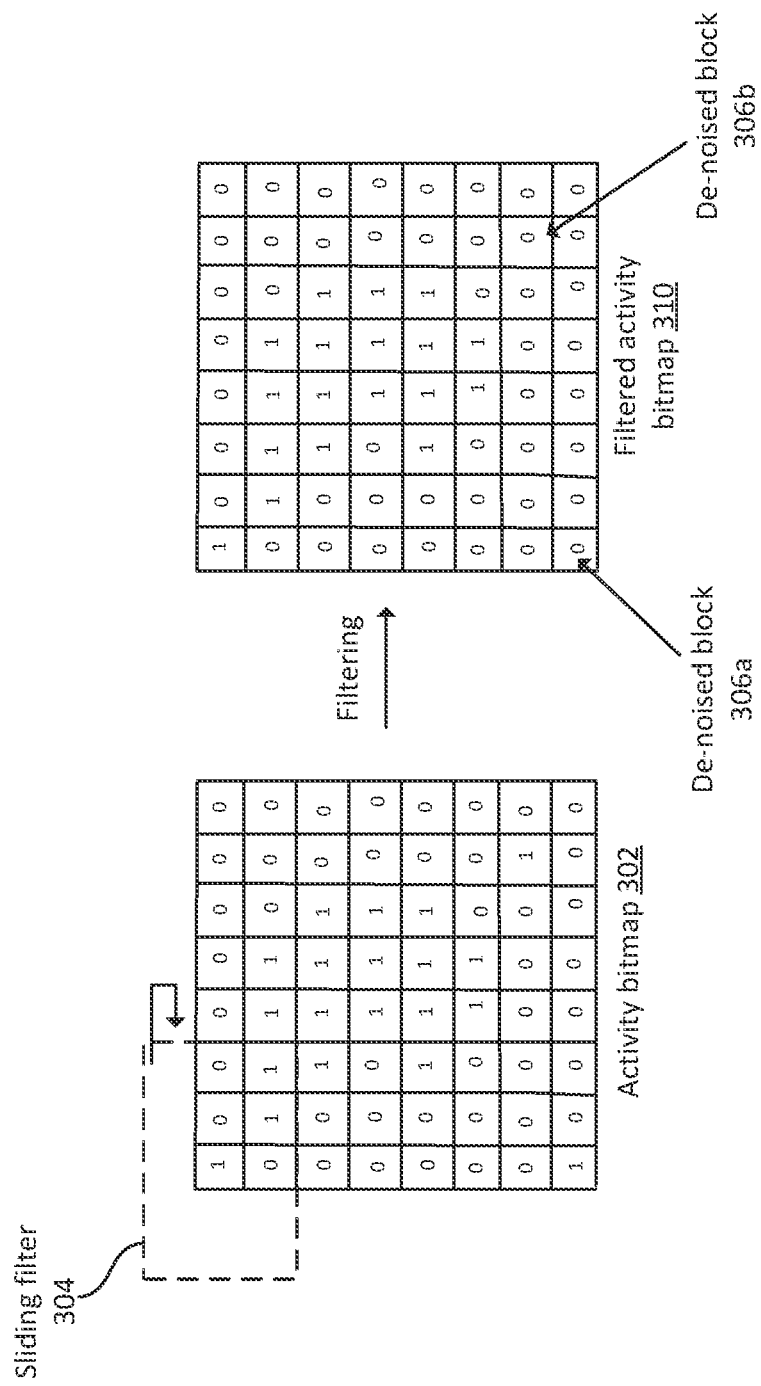
FIG. 3 is an example de-noising operation for an activity bitmap that may be used in some examples of image signal processor-based motion detection, in accordance with various aspects of the present disclosure.

In various examples, this comparison may take the form of Equation (1):

$$\text{Activity}[\text{block}] = |(\text{Yp}_{acc}[\text{block}] * \text{ratio\_den}[\text{zone}]) - (\text{Yp}_{ref}[\text{block}] * \text{ratio\_num}[\text{zone}])| \geq \text{threshold}[\text{zone}] \quad (1)$$

where $\text{Yp}_{acc}[\text{block}]$ represents the combined intensity value of a given block of the current frame, $\text{Yp}_{ref}[\text{block}]$ represents the combined intensity value of the corresponding block of the reference frame, ratio_den[zone] is a denominator of a per-activity zone ratio, ratio_num[zone] is a numerator of the per-activity zone ratio, and threshold[zone] is a zone-specific threshold value. The zone-specific threshold value threshold[zone] is tunable depending on the desired motion sensitivity of a user-defined zone. Software may be used to set both the ratio_den and ratio_num to 0, as well as a non-zero zone threshold value to set up an inactive zone (e.g., a zone in which motion is not to be detected). Activity [block] may be set to true (e.g., "1") if the condition is met and false (e.g., "0") if the condition is not met, where 1 indicates that the change in intensity from the reference frame to the current frame exceeds the threshold; although it should be noted that this implementation may be switched such that 0 refers to the condition being met. The per-zone threshold can be used to account for saturation in the frame. Equation (1) implements the decision of action 128 in FIG. 1 and is used to generate a binary, per-block activity bit-map (action 130). Examples of such activity bit-maps are depicted in FIG. 3.

The ratio_den and ratio_num values in Equation (1) enable the per-block comparison between the current frame and the reference frame to represent a difference in magnitude or a percentage difference between the respective per-block intensity values. For example, if ratio_num and ratio_den are set to 1, Equation (1) calculates the magnitude of the difference in per-block combined intensity values between the current frame and reference frame. However, if the ratio_num and ratio_den are set to unequal values the comparison measures the relative amount of change in intensity between the two blocks. For example, a change from a value of 10 to a value of 30 and from a value of 100 to 120 may both have difference magnitude of 20 (i.e., 30−10=20 and 120−100=20); however, the change from 10 to 30 represents a 3× change, while the change from 100 to 120 represents only a 1.2× increase. Accordingly, Equation (1) may generate a comparison value that represents the change in a relative sense in the intensity values between a block in the current frame and the corresponding block in the reference frame.

The ratio_num[zone] and ratio_den[zone] may be determined as follows:

$$\text{ratio} = \frac{Ypacc[\text{block}] - Yref[\text{block}]}{Yref[\text{block}]}$$

$$\text{ratio} * Yref[\text{block}] = Ypacc[\text{block}] - Yref[\text{block}]$$

$$(\text{ratio} + 1) * Yref[\text{block}] = Ypacc[\text{block}]$$

$$\frac{Ypacc[\text{block}]}{Yref[\text{block}]} = \text{ratio} + 1$$

Substituting:

$$\text{ratio} + 1 = \frac{\text{ratio\_num[zone]}}{\text{ratio\_den[zone]}}$$

Yields:

$$\frac{Ypacc[\text{block}]}{Yref[\text{block}]} = \frac{\text{ratio\_num[zone]}}{\text{ratio\_den[zone]}}$$

$$Ypacc[\text{block}] * \text{ratio\_den[zone]} = Yref[\text{block}] * \text{ratio\_num[zone]}$$

$$Ypacc[\text{block}] * \text{ratio\_den[zone]} - Yref[\text{block}] * \text{ratio\_num[zone]} = 0$$

After setting a threshold and using absolute values for motion detection, Equation (1) is generated:

|Ypacc[block]*ratio_den[zone]−Yref[block]*ratio_num[zone]|≥threshold[zone]

After the activity bit-map is generated at action 130 by comparing the un-demosaiced frame of pixel data 112 with the reference frame of un-demosaiced pixel data 120, an optional de-noising filter 132 may be applied to the activity bit-map to filter out aberrant, isolated blocks to reduce noise. This optional de-noising filter is described in further detail below in reference to FIG. 3.

At action 134, a determination may be made of the number of active blocks in each predefined zone. An active block refers to a block in which equation (1) is satisfied resulting in the setting of an activity flag (e.g., to "1" or another value, depending on the desired implementation). A zone block counter may be incremented for each block in the current zone that has the activity flag set. After accounting for each block in the zone, the value of the zone block counter may be compared to a threshold number of blocks for the zone. If the number of active blocks exceeds the threshold number of blocks for the zone (determined at action 136), motion may be detected in the zone (action 138). In various examples, a signal indicating detected motion may be sent to a remote device (e.g., a user device, such as a user's phone). In some examples, the signal may indicate the zone in which the motion was detected. Conversely, if the number of active blocks is less than the threshold number of blocks for the zone, no motion may be detected for the zone (action 140). In various examples, software may be used to either count the prefiltered activity bits (e.g., the activity bit-map prior to application of the optional de-noising filter 132) or the filtered activity bits (e.g., the activity bit-map post application of the optional de-noising filter 132) for a given zone.

The reference frame 120 may be written back to memory. In some examples, the reference frame 120 may be updated with the results calculated from the current frame, or it can be the same reference frame 120 read from memory unmodified, based on the mode of operation. In various examples, a new reference frame may be stored periodically.

In various examples, a motion detection event detected by one or more PIR sensors may be used to trigger operation of the ISP-based motion detector 102. Further, in some examples, if motion is detected in a particular activity zone by ISP-based motion detector 102, the relevant activity zone may be cropped from one or more frames captured by the camera and sent to an object detector (e.g., a convolutional neural network (CNN) based classifier) to determine if an object of a class for which the object detector has been trained to detect (e.g., humans) is found within the cropped zone. If so, the camera device may be controlled to begin encoding and sending video to a remote device (e.g., to a cloud-based system and/or to a mobile device associated with the particular camera). Accordingly, in various examples, there may be three layers of motion detection prior to encoding and/or sending video off device.

Encoding and transmitting video may be relatively resource intensive operations in terms of power consumption, which may be of significant concern for battery-operated camera devices. Accordingly, described herein is a multi-tiered approach that employs a lowest power approach for a coarsest level of motion detection (e.g., PIR-based motion detection). If the PIR sensor detects motion, the above-described motion detection techniques of the ISP-based motion detector 102 may be initiated. If motion is detected in one or more activity zones by the ISP-based motion detector 102, the relevant activity zones may be cropped and the cropped image data may be sent to a computer vision based object detector (e.g., a CNN-based or visual transformer-based object detector) to determine whether any objects of predefined classes (e.g., humans, cars, etc.) are detected in the cropped activity zones. If so, streaming of video by the camera device may be initiated and an alert may be sent to a user device that is associated with the camera device. Conversely, if no object of the relevant class(es) is detected in the cropped image data, the camera device and various motion detection systems may continue to monitor for motion without streaming video data off device.

FIG. 3 is an example de-noising operation for an activity bitmap that may be used in some examples of image signal processor-based motion detection, in accordance with various aspects of the present disclosure. Activity bitmap 302 is an example of an activity bitmap that may be generated by comparing a current frame of image data captured by a camera device (e.g., un-demosaiced frame of pixel data 112) with a previously-stored reference frame of image data (e.g., reference frame of un-demosaiced pixel data 120) using the techniques described above in FIG. 1 (e.g., the activity bitmap generated at action 130).

In the example activity bitmap 302, a value of 1 represents a block for which there is a significant different in pixel intensity between the current frame and the reference frame (satisfying equation (1) as discussed above in reference to FIG. 1), while a zero indicates that the equation is not satisfied (e.g., that the difference between the block in the current frame and the corresponding block in the reference frame is deemed non-significant). A sliding filter may be used to flip isolated bits in the activity bitmap 302 (as part of the optional de-noising filter 132 of FIG. 1).

If enabled, a sliding filter 304 can be applied to the prefiltered activity bitmap 302, to filter out one-off blocks to reduce noise. In various examples, the sliding filter 304 may be of a shape that is wider than high (in terms of a number of blocks). For example, a 5-block by 3-block (width× height) matrix may be used for sliding filter 304. Each block of the sliding filter 304 may be associated with a weight value. Each position on the activity bitmap 302 may be evaluated by positioning the center element of the sliding filter 304 over the position. The weights of the sliding filter 304 may be multiplied by the activity bit map values with which they overlap and the results may be summed and compared to a threshold value. Off-frame blocks may be padded with assigned activity values of zero (or using mirroring of the edge blocks, depending on the implementation). Zone information may be ignored. For each block with position (x,y), the filtered activity may be calculated using:

```
for (row=0; row <3; row++) {
    for (col=0; col<5; col++) {
        filter_val[x,y]+=blk_prefiltered_activity[x+row−1,
            y+col−2]*weight[row,col];
    }
}
blk_filtered_activity[x,y]=(filter_val[x,y]>=filter_threshold)
```

Accordingly, the output of the filtering of activity bitmap 302 is filtered activity bitmap 310 in which de-noised block 306a and 306b (which were set to active ("1") in activity bitmap 302) are flipped to inactive ("0") in the filtered activity bitmap 310. Accordingly, filtered activity bitmap 310 may be a modified activity bitmap with respect to activity bitmap 302 (as one or more bits have been flipped using the sliding filter 304). The modified, filtered activity bitmap 310 may flip the bits of blocks that are outliers with respect to the activity of neighboring blocks.

In various examples, the width of the sliding filter 304 (in terms of a first number of pixels defining the width of the sliding filter 304) may be greater than the height (in terms of a second number of pixels defining the height of the sliding filter 304). This may be because motion in the real world tends to be horizontal (e.g., with respect to the horizon) rather than vertical. Accordingly, using a sliding filter 304 with a geometry that is wider than it is tall may consider more information in the horizontal plane relative to the vertical plane, resulting in improved motion detection in the horizontal plane and/or fewer false positives. In addition, using a filter with fewer rows may reduce computational burden during processing. This may be because each row of the filter is stored in memory during raster scanning in order to compute the output, filtered value. Accordingly, the fewer rows required, the lesser the memory requirements for the filtering operation.

Figure 4:
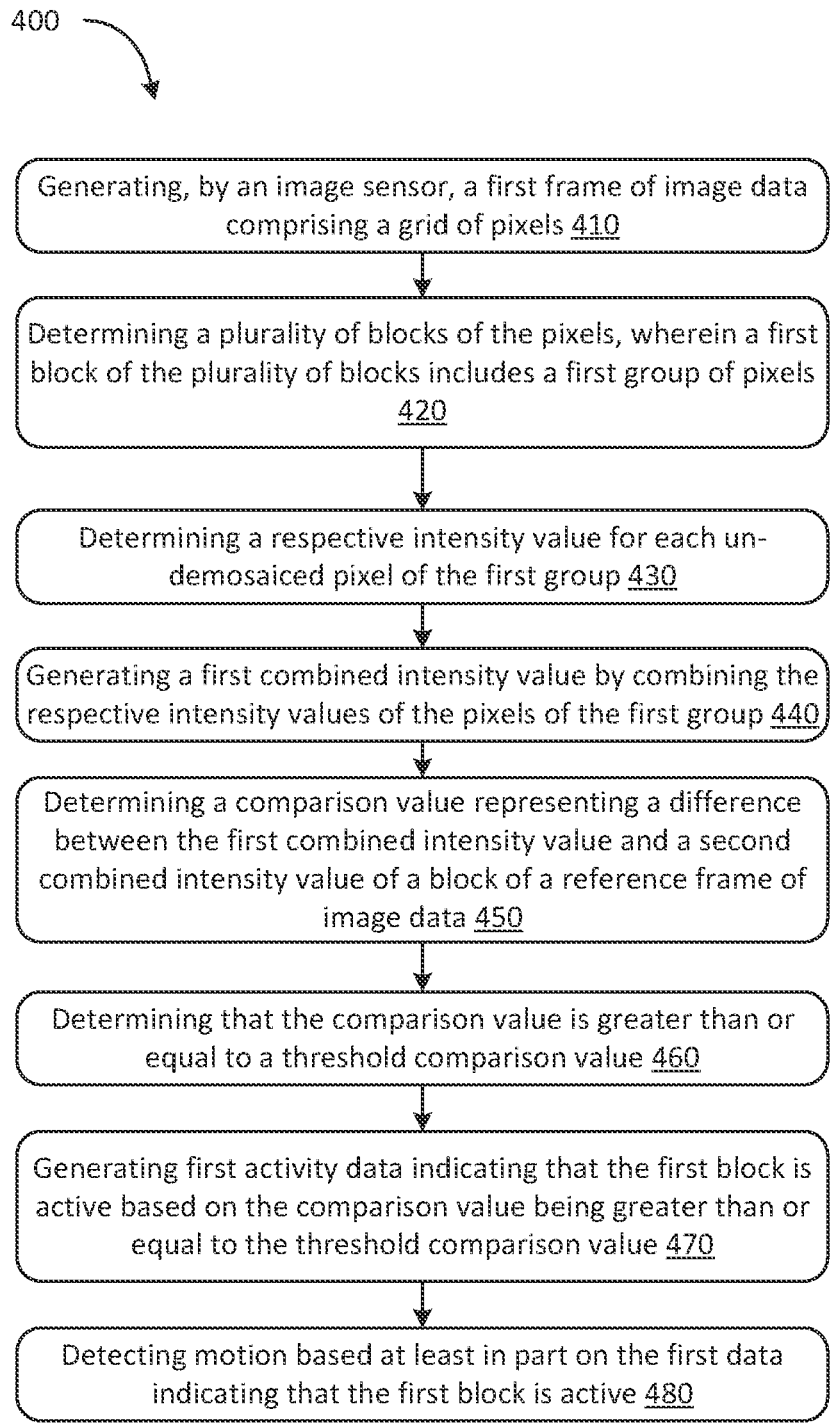
FIG. 4 depicts an example process that may be used to detect motion using image signal processor-based motion detection, in accordance with various embodiments of the present disclosure.

FIG. 4 depicts an example process 400 that may be used to detect motion using image signal processor-based motion detection, in accordance with various embodiments of the present disclosure. The actions of the process 400 may represent a series of instructions comprising computer readable machine code executable by a processing unit of an image signal processor, although various operations may be implemented in hardware. In various examples, the computer readable machine codes may be comprised of instructions selected from a native instruction set of the processor(s) and/or an operating system of the computing device.

Process 400 may begin at action 410, at which a first frame of image data may be generated by an image sensor. The first frame of image data may comprise a two-dimensional grid of pixels (e.g., with each pixel corresponding to an individual photosensor of the photosensor array of the image sensor and to an individual element of the color filter array).

Processing may continue at action 420, at which a plurality of blocks of the pixels of the first frame of image data may be determined. For example, the first frame of image data may be conceptually divided into a grid of blocks of pixels (e.g., where each block is the same size with respect to each other block—although the blocks may be of different sizes depending on the desired implementation). A first block of the plurality of blocks of pixels may include a first group of contiguous pixels (e.g., the pixels of the first block) if pixel intensity values are being calculated. In an alternate implementation using Laplacian edge values, the first block may include a first group of green pixels.

Processing may continue at action 430, at which a respective intensity value may be determined for each un-demosaiced pixel of the first group (or for each un-demosaiced green pixel of the first group if using the edge-based implementation). Action 430 may be performed in hardware on chip by the image signal processor prior to color filter array interpolation (demosaicing). The intensity value may be the input pixel value (e.g., a numerical value representing the magnitude of light detected by the individual photosensor corresponding to the pixel value) multiplied by the relevant color channel gain for the pixel. For example, if the pixel is a red pixel (e.g., the pixel is tagged as red since it corresponds to a red color filter on the color filter array) the input value for the pixel may be multiplied by a gain value specific to the red color channel. In other examples, the per-pixel intensity value may be a Laplacian edge value (e.g., a two-dimensional measure of the second spatial derivative of the image) calculated using green pixels of the relevant block.

Processing may continue at action 440, at which a first combined intensity value may be generated by combining the respective intensity values of the pixels of the first group. For example, an adder circuit may be used to add the respective intensity values of each pixel of the first block (e.g., the pixels of the first group) or the edge intensity values of the first block and may store the sum in memory as the first combined intensity value for the first block. This operation may be performed for each block such that each block is associated with a combined intensity value for that block. In another example, instead of storing the sum of the individual pixel values of the block, the average pixel value (or average edge value) may instead be determined and stored in memory.

Processing may continue at action 450, at which a comparison value representing a difference (e.g., a difference magnitude or percentage difference) between the first combined intensity value and a second combined intensity value of a block of a reference frame of image data may be determined. The reference frame may be a frame of image data captured by the image sensor at any point prior to the current frame being evaluated (e.g., the first frame generated at action 410). The reference frame may be processed in the same way as described above with respect to the first frame such that per-block intensity information is available for the reference frame. Additionally, the size (dimensions in terms of pixel height and pixel width) and positioning of the blocks in the reference frame may be the same such that for each block of the reference frame there is a corresponding block in the current frame of image data. Individual blocks may be identified using block identifier data (e.g., by numbering the blocks) and/or by storing coordinate data representing a position of a given block within the frame. The comparison value may represent a difference between the first block of the first frame and the corresponding block of the reference frame. The comparison value may represent a magnitude of difference (or a relative difference) between the combined intensity values determined for these two blocks. The comparison value may be determined as described above in equation (1). It should be noted that the "blocks" described herein are markedly different from macroblocks used in the calculation of motion vectors during video encoding and compression/decompression. This is because the processing steps described above are done prior to demosaicing/color filter array interpolation and thus represent only intensity values/Laplacian edge values of a captured image frame and do not include full color information for the frame. This reduces both latency and compute resource consumption. Additionally, the motion detection steps described herein can be performed in hardware on the ISP chip. However, certain components of the ISP-based motion detection techniques described herein are configurable using software. For example, activity zones may be configured, whether or not to use the sliding de-noising filter when determining the number of active blocks may be configurable, the various thresholds may be selected and/or modified (to tune motion detection sensitivity), etc.

Processing may continue at action 460, at which a determination may be made that the comparison value is greater than or equal to a threshold comparison value. In various examples, the threshold comparison value may be specific to a particular activity zone. The activity zones may be user selected (e.g., via a graphical user interface of a companion application associated with the camera device) and the thresholds may also be changed in order to affect the sensitivity of the motion sensor. Activity zones may include contiguous and/or non-contiguous blocks.

Processing may continue at action 470, at which first activity data may be generated indicating that the first block is active based on the comparison value being greater than or equal to the threshold comparison value. For example, the comparison value for the first block may be greater than the threshold comparison value for an activity zone of which the first block is a part. The activity data indicates whether a corresponding block is "active" (e.g., the activity data comprising a bit indicating that the block is active since the comparison value with respect to the corresponding block in the reference frame is greater than the activity zone-specific threshold) within the activity bitmap (e.g., activity bitmap 302 of FIG. 3). As previously described, in various examples, the activity bitmap may be de-noised prior to the ultimate determination of whether motion is detected in one or more zones using a sliding filter.

Processing may continue at action 480, at which motion may be detected based at least in part on the first data indicating that the first block is active. In various examples, the activity zone of which the first block is a part may be determined. This activity zone may be associated with a threshold number of blocks (e.g., a threshold number of active of blocks). Accordingly, the number of active blocks in the bitmap that belong to the same activity zone may be determined and compared to the threshold number of blocks for that activity zone. If the number of active blocks meets or exceeds the threshold number of blocks motion may be detected in the zone. The particular action that is taken as a result of motion being detected is dependent on the particular implementation. In various examples, alert data may be generated to indicate that motion has been detected. However, in other examples, the detection of motion in a particular activity zone may cause the portion of the image frame corresponding to the activity zone to be cropped (e.g., post-CFA interpolation processing and/or other processing performed by the ISP) and sent to a machine learning based object detector to determine if any objects for which the object detector has been trained to detect are present in the frame.

Figure 5:
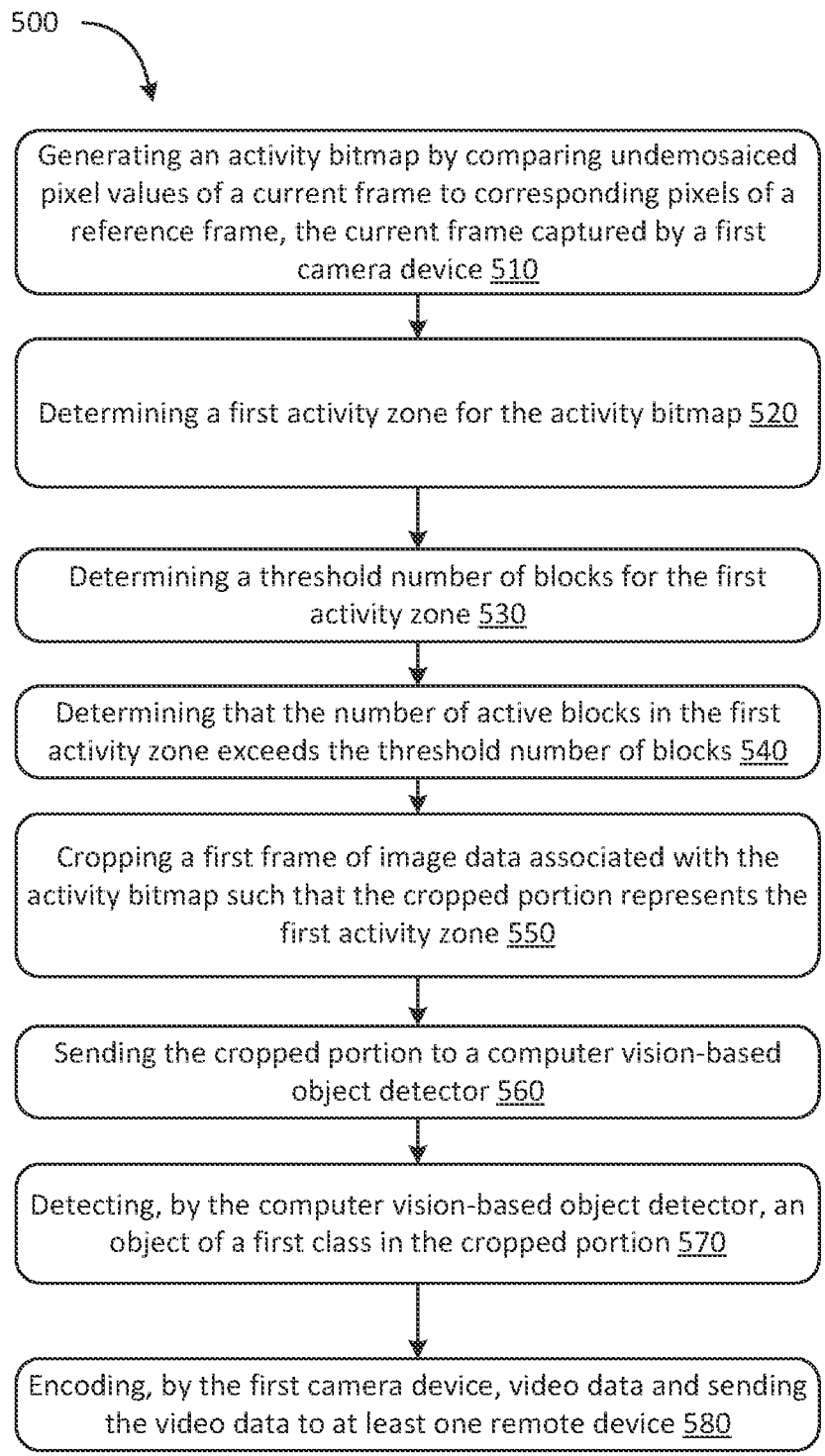
FIG. 5 depicts another example process that may be used to determine whether to encode and send image/video data from a camera device to one or more remote devices, in accordance with various embodiments of the present disclosure.

FIG. 5 depicts an example process 500 that may be used to detect motion using image signal processor-based motion detection and an object detector, in accordance with various embodiments of the present disclosure. The actions of the process 500 may represent a series of instructions comprising computer readable machine code executable by a processing unit of an image signal processor, although various operations may be implemented in hardware. In various examples, the computer readable machine codes may be comprised of instructions selected from a native instruction set of the processor(s) and/or an operating system of the computing device.

Process 500 may begin at action 510, at which an activity bitmap may be generated by comparing undemosaiced pixel values of a current frame of image data to corresponding pixels of a reference frame. The current frame (and/or the reference frame) may be captured by a camera device. For example, the activity bitmap may be generated as described above in reference to FIGS. 1-4. Each active block of the activity bitmap may represent a significant change in intensity values for the pixels of the block as compared to the intensity values of the corresponding block of pixels in the reference frame.

Processing may continue at action 520, at which a first activity zone may be determined for the activity bitmap. The activity zones may be user selected (e.g., via a graphical user interface of a companion application associated with the camera device). Each activity zone (see, e.g., the zones depicted in FIG. 2) may be associated with a respective difference threshold (e.g., the difference threshold used in Equation (1)) and with a threshold number of blocks used to detect motion as described above. The threshold number of blocks for the first activity zone may be determined at action 530. If the number of active blocks in the activity bitmap (e.g., activity bitmap 302) meets or exceeds the threshold number of blocks for the first activity zone motion may be detected in the first activity zone. At action 540, the number of active blocks in the first activity zone is determined to exceed the threshold number of blocks. Accordingly, motion has been detected by the ISP-based motion detector in the first activity zone.

Processing may continue at action 550, at which the first frame of image data from which the activity bitmap was generated may be cropped such that the cropped portion represents the first activity zone in which motion was detected. Processing may continue to action 560, at which the cropped portion may be sent to a computer vision-based object detector. In various examples, the frame may be processed by the ISP (e.g., so that full color information for each pixel is determined, white balancing, gamma correction, etc., is performed) prior to cropping. At action 570, the computer vision-based object detector may be used to detect an object of a first class (e.g., a human, if that is what the computer vision-based object detector has been trained to detect) is represented in the cropped portion. As previously described, the computer vision-based object detector may be implemented as a CNN-based object detector, a vision transformer-based object detector, etc.

Processing may continue to action 580, at which the first camera device may encode the video data and may send the encoded video data to at least one remote device (e.g., a server and/or a user device). In some examples, the encoding and sending may be conditioned on both the ISP-based motion detector detecting motion as well as the computer vision-based object detector detecting a predefined object of interest. Additionally, in at least some examples, the operation of the ISP-based motion detector and/or the computer vision-based object detector may be conditioned on a PIR sensor of the first camera device detecting motion. Accordingly, there is a multi-tiered approach to conserve power consumption and prevent motion detection false positives.

Figure 6:
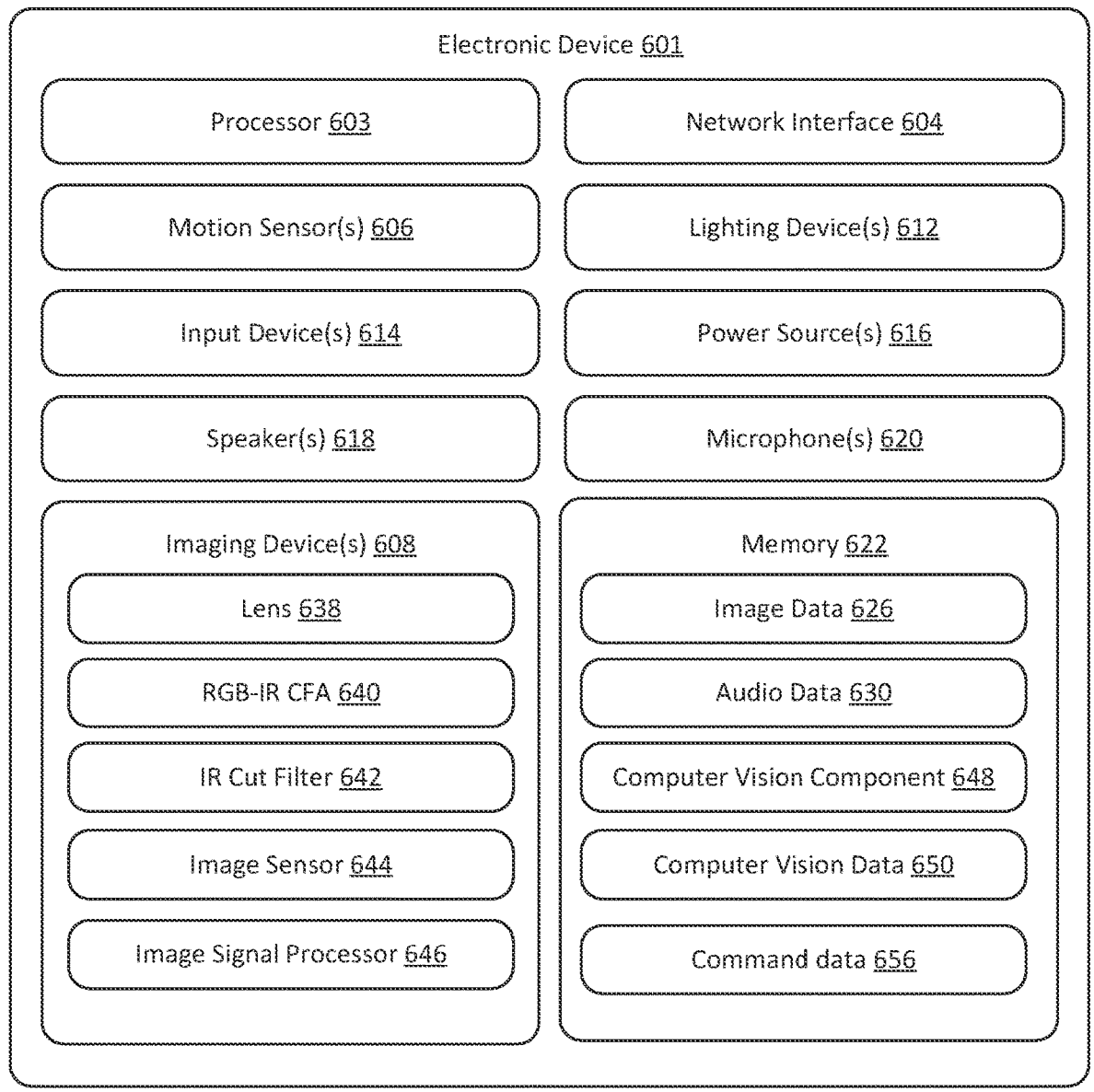
FIG. 6 depicts an example device that may implement image signal processor-based motion detection, in accordance with embodiments of the present disclosure.

FIG. 6 illustrates an example architecture of a camera device (e.g., electronic device 601) that may be configured to perform the ISP-based motion detection techniques described herein. electronic device 601. As shown, the electronic device 601 may include one or more processors 603, one or more network interfaces 604, one or more motion sensors 606, one or more imaging devices 608, one or more lighting devices 612, one or more input devices 614, one or more power sources 616, one or more speakers 618, one or more microphones 620, and memory 622.

The motion sensor(s) 606 may be any type of sensor capable of detecting and communicating the presence of an object within their field of view. As such, the motion sensor(s) 606 may include one or more (alone or in combination) different types of motion sensors. For example, in some embodiments, the motion sensor(s) 606 may comprise passive infrared (PIR) motion sensors, which may be secured on or within a PIR sensor holder that may reside behind a lens (e.g., a Fresnel lens). As previously described, the PIR sensors may detect IR radiation in a field of view, and produce an output signal (typically a voltage) that changes as the amount of IR radiation in the field of view changes. The amount of voltage in the output signal may be compared, by the processor(s) 603, for example, to one or more threshold voltage values to determine if the amount of voltage in the output signal is indicative of motion, and/or if the amount of voltage in the output signal is indicative of motion of an object that is to be captured by the imaging device(s) 608. In some examples, the processor(s) 603 may determine the distance based on the amount of voltage in the output signal. Additionally, or alternatively, in some examples, the processor(s) 603 may determine the distance based on which motion sensor 606 detected the object.

Although the above discussion of the motion sensor(s) 606 primarily relates to PIR sensors, depending on the example, the motion sensor(s) 606 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 606. In various examples, circuitry may be included in the electronic device 601 and/or in the image signal processor 646 that may be effective to perform the various ISP-based motion detection techniques described herein. In various examples, a PIR sensor or other motion sensor may be used to perform coarse motion detection. Once the PIR sensor or other motion sensor is triggered, other motion sensing techniques (e.g., the ISP-based motion detection and/or the CV-based object detection) may be triggered.

An imaging device 608 may include any device that includes an image sensor 644, such as a charge-coupled device (CCD) and/or an active-pixel sensor (CMOS sensor), that is capable of generating image data 626 (which may represent, and/or include, the frames of image data described herein), representing one or more images (e.g., a video). The imaging device 608 may include a lens 638 that is effective to focus light on the image sensor 644. As previously described, the light may be filtered by an RGB CFA 640 (e.g., a Bayer CFA) or an RGB-IR CFA. In one aspect of the present disclosure, the image sensor 644 may comprise a complementary metal-oxide semiconductor (CMOS) array and may be capable of recording high definition (e.g., 722p, 1800p, 4K, 8K, etc.) image and/or video files. The image sensor 644 may comprise a plurality of photosensors that may transform light into electrical signals. Such electrical signals may be represented by numerical values (e.g., floating point numbers) that may be processed using the image signal processor 646. Each photosensor of the image sensor 644 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture. As previously described intensity values for each pixel may be used in one or more of the ISP-based motion detection techniques described herein. Intensity values may be Laplacian edge values and/or may be the input pixel value multiplied by the color channel gain for the color channel of the pixel (e.g., R, G, B, or IR).

In some other examples, the image sensor may be coated with a dual band-pass filter that has a passband at about 900 nm to allow IR color reproduction during the day and also to allow IR light detection when the imaging device(s) 608 are in night mode. In some examples, the electronic device 601 may include an IR cut filter (not shown) to filter out infrared light from the light path of the photosensors when the electronic device 601 is configured in day mode. The IR cut filter may be removed from the light path such that infrared light may reach the photosensors when the electronic device 601 is configured in night mode.

The imaging device 608 may include a separate image signal processor 646 (e.g., including image signal processor architecture 700 or some other desired architecture), or the processor(s) 603 may perform the camera processing functionality. The processor(s) 603 (and/or camera processor) may include an encoding and compression chip. In some embodiments, the processor(s) 603 (and/or the camera processor) may comprise a bridge processor. The processor(s) 603 (and/or the camera processor) may process video recorded by the image sensor and may transform this data into a form suitable for transfer by the network interface(s) 604. In various examples, the imaging device 608 also includes memory, such as volatile memory that may be used when data is being buffered or encoded by the processor(s) 603 (and/or the camera processor). For example, in certain embodiments the camera memory may comprise synchronous dynamic random-access memory (SD RAM).

The lighting device(s) 612 may be one or more light-emitting diodes capable of producing visible light and/or infrared light when supplied with power (e.g., to enable night vision). In some embodiments, when activated, the lighting device(s) 612 illuminates a light pipe. In some examples, the electronic device 601 uses the lighting device(s) 612 to illuminate specific components of the electronic device 601, such as the input device(s) 614. This way, users are able to easily see the components when proximate to the electronic device 601.

An input device 614 may include, but is not limited to, a button, a touch-sensitive surface, a switch, a slider, and/or any other type of device that allows a user to provide input to the electronic device 601. For example, if the electronic device 601 includes a doorbell, then the input device 614 may include a doorbell button. In some examples, based on receiving an input, the processor(s) 603 may receive a signal from the input device 614 and use the signal to determine that the input device 614 received the input. Additionally, the processor(s) 603 may generate input data representing the input received by the input device(s) 614. For example, the input data may represent the type of input (e.g., a push to a button), a time that the input occurred, and/or the like.

The power source(s) 616 may include one or more batteries that provide power to the electronic device 601. However, in other examples, the electronic device 601 may not include the power source(s) 616. In such examples, the electronic device 601 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 618 may be any electromechanical device capable of producing sound in response to an electrical signal input. The microphone(s) 620 may be an acoustic-to-electric transducer or sensor capable of converting sound waves into audio data 630 representing the sound. The speaker(s) 618 and/or microphone(s) 620 may be coupled to an audio CODEC to enable digital audio received by user devices to be decompressed and output by the speaker(s) 618 and/or to enable audio data captured by the microphone(s) 620 to be compressed into digital audio data 630. In some examples, the electronic device 601 includes the speaker(s) 618 and/or the microphone(s) 620 so that the user associated with the electronic device 601 can communicate with one or more other users located proximate to the electronic device 601. For example, the microphone(s) 620 may be used to generate audio data representing the speech of the one or more other users, which is then sent to the camera device. Additionally, the speaker(s) 618 may be configured to output user speech of the user, where the user's user speech may also be represented by audio data 630.

In some examples, the electronic device 601 determines that the start of the video is the first frame of the video. In some examples, such as when the electronic device 601 continuously generates the image data (e.g., the electronic device 601 does not turn off the imaging device(s) 608), the start of the video corresponds to the portion of the video that the imaging device(s) 608 were generating right after detecting an event. For example, the start of the video may correspond to the first frame of the video after detecting the event. In other examples, such as when the electronic device 601 does not continuously generate the image data 626 (e.g., the electronic device 601 turns off the imaging device(s) 608 until detecting an event such as a motion event), the start of the video corresponds to the first frame of the video that is generated by the imaging device(s) 608.

As further illustrated in the example of FIG. 6, the electronic device 601 may include the computer-vision component 648. The computer-vision component 648 may be configured to analyze the image data 626 using one or more computer-vision techniques and output computer-vision data 650 based on the analysis. The computer-vision data 650 may represent information, such as the presence of an object represented by the image data 626, the type of object represented by the image data 626, locations of the object relative to the electronic device 601, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 650 may further represent a bounding box indicating the respective location of each object represented by the image data 626.

For example, the computer-vision component 648 may analyze the image data 626 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 648 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer vision component 648 may be used to evaluate cropped activity zones in which motion has been detected using the ISP-based motion detection techniques described herein. In various examples, upon detecting an object of interest in the cropped activity zone, the electronic device may begin encoding and transmitting captured video to one or more remote devices.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions)

in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 648 may use object detection technique(s) that use computer-vision analysis to perform informative region selection, features extraction, and then classification of object(s) represented by the image data 626. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 601 may also store command data 656. In some circumstances, a user of the electronic device 601 may want to receive a live view from the electronic device 601. The command data 656 may represent an identifier associated with the electronic device 601, a command to generate the image data 626, a command to send the image data 626, and/or the like. In some examples, the electronic device 601 may then analyze the command data 656 and, based on the identifier, determine that the command data 656 is directed to the electronic device 601. For example, the electronic device 601 may match the identifier represented by the command data 656 to an identifier associated with, and stored by, the electronic device 601. Additionally, the electronic device 601 may cause the imaging device(s) 608 to begin generating the image data 626 (e.g., if the imaging device(s) 608 are not already generating the image data 626) and send the image data 626 to the one or more computing devices implementing the ISP-based motion detector 102, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 7:
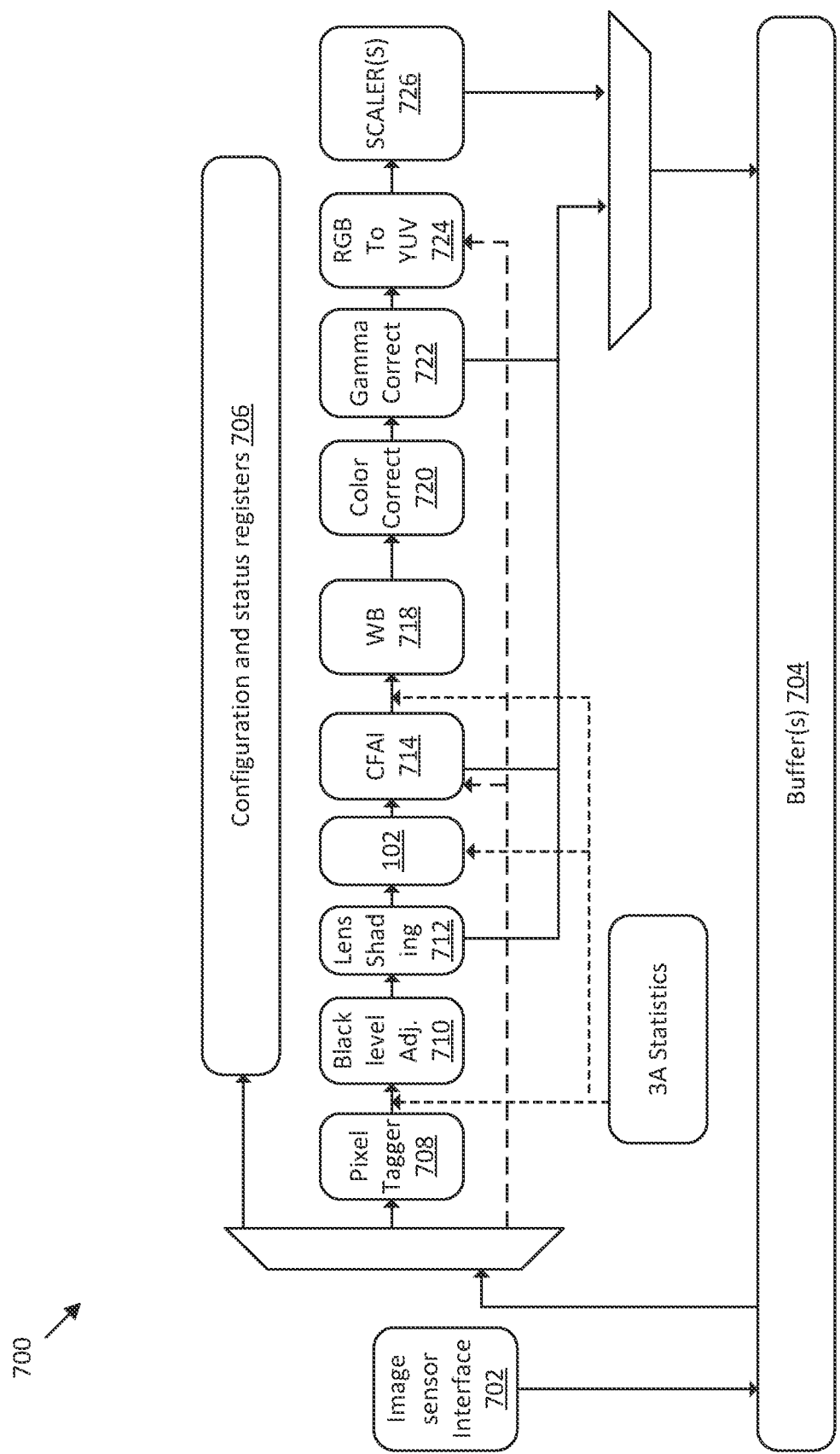
FIG. 7 depicts an example architecture of an image signal processor that may implement image signal processor-based motion detection, in accordance with various examples described herein.

FIG. 7 is a block diagram of an example image signal processor architecture 700 that may be used in accordance with various aspects of the present disclosure. In some examples, an image signal processor may be implemented with a different architecture relative to the example image signal processor architecture 700 displayed in FIG. 7. For example, certain components may be omitted, additional components may be added, and/or some components may be substituted for other, different components, depending on the desired implementation.

The image signal processor architecture 700 (e.g., an image signal processor (ISP)) may include an image sensor interface 702 that receives image data from the image sensor (e.g., as filtered using the CFA). For example, the image sensor interface 702 may be a mobile industry processor interface ("MIPI") such as MIPI D-PHY or MIPI C-PHY. MIPI D-PHY is a physical layer that includes a clock-forwarded synchronous link providing low noise and high jitter tolerance. MIPI D-PHY uses one clock lane and a variable number of data lanes to receive the image data from the image sensor. MIPI C-PHY, by contrast, uses an embedded clock that is embedded into the data lane. In various examples, the image sensor interface 702 may bridge a MIPI controller interface data to a streaming interface (e.g., an AXI streamlining interface) that writes data to AXI memory.

Buffer(s) 704 may comprise one or more circular buffers that may be used for streamlining to/from AXI (or other streaming protocols). In various examples, inbound data streams may be managed by circular buffer readers and outbound data streams may be managed by circular buffer writers. The buffer(s) 704 may use circular buffer management addresses/pointers to map an AXI stream either to or from linear AXI memory. This streamlining to/from circular buffers provides data storage/capture/replay capability in static random access memory (SRAM).

Configuration and status registers 706 may store various configuration data such as, for example, CFA index values, pixel color values associated with different CFA index values (e.g., in a table), per-CFA index offset values, gain values for reference illuminants, the various thresholds described above, CCM values, etc. As described below, various components of the image signal processor architecture 700 may reference configuration and/or status data stored by configuration and status registers 706 during operation.

Image data may be received via image sensor interface 702 as an inbound pixel stream (IPS) comprising raw pixel values generated by the image sensor. Pixel tagger 708 may include circuitry (e.g., an ASIC) that tags the IPS data with metadata representing a coordinate (e.g., an X, Y coordinate) corresponding to the location of the pixel on the image sensor and/or the corresponding frame of image data. In addition, the pixel tagger 708 may tag the pixel with metadata representing an index position of the CFA. The X, Y coordinates may be used to lookup the pixel color (e.g., to represent the pixel as a red, green, blue, or infrared pixel based on the type of filter found at the index of the CFA). In some cases, metadata representing the pixel color (red, green, blue, or IR) may also be used by pixel tagger 708 to tag the inbound IPS data.

For example, pixel tagger 708 may use the frame width (in terms of a number of pixels) and height (in terms of a number of pixels) to tag the incoming raw pixel value (IPS data) with an X-Y position within the frame. The X, Y coordinates may be used to lookup a pixel color in a 16 entry table (e.g., corresponding to the color filters of the CFA) to label each pixel value with pixel color metadata. Similarly, each pixel value may be labeled with a CFA index (e.g., 0-15) that corresponds to the pixel value.

After tagging the pixel values using the pixel tagger 708 (as described above), the pixel values may be provided to black level adjustment component 710. Black level adjustment component 710 may include circuitry (e.g., an ASIC) effective to subtract a fixed direct current (DC) offset value from the input pixel values to adjust the black level of the image data. The particular DC offset value may be specific to each CFA index. Accordingly, the CFA index value metadata generated by pixel tagger 708 may be used by black level adjustment component 710 to determine the appropriate DC offset value to subtract for each pixel.

In various examples, the image signal processor architecture 700 may include a lens compensation component (not shown). A lens compensation component may be used to add a signed per-CFA index offset to compensate for veiling glare resulting from a lens of the camera generating the image data. Further, in some examples, a lens compensation component may apply a common multiplier (uniform gain) to all pixels to boost the signal. Further, in some examples, the lens compensation component (and/or a separate component) may perform defective pixel correction (DPC). DPC may evaluate each pixel's raw pixel value against an expected range of pixel values that is estimated using nearby pixels (e.g., adjacent pixels and/or pixels within a predefined distance from the subject pixel). If the pixel's raw pixel value is out of range the pixel may be deemed "defective" and the raw pixel value may be replaced by a pixel value that is estimated using nearby pixels of the same pixel color.

The pixel data may be sent to the lens shading component 712. In some examples, the lens shading component 712 may be combined with a lens compensation component. However, in other implementations, these components may be implemented using separate circuits and/or modules. Lens shading component 712 may compensate for lens and camera defects and/or tolerances, as well as lens edge transmission characteristics by applying a per-pixel color gain based on the X, Y position of the pixel in the frame. In various examples, the lens shading component 712 may lookup the per-pixel color gain using the X, Y position metadata of the pixel (added by pixel tagger 708) in a table stored in configuration and status registers 706. In various examples, the per-pixel color gain may also be determined using the metadata indicating the pixel's color. The gain may be multiplicatively applied to the pixel using a multiplier circuit of the lens shading component 712 in order to account for lens properties and manufacturing tolerances. In various implementations, the per-pixel color gain may be determined using the pixel's X, Y position metadata to identify a lens-shading cell of a grid. The corners of the cell may define the four corner grid points. Each corner grid point may be associated with a respective lens shading gain for the pixel's pixel color. The four lens shading gains may be interpolated to determine the gain to be applied to the pixel.

After lens shading component 712, the pixel intensity values may be determined (e.g., by multiplying the raw pixel values by per-color channel gains and/or by determining the Laplacian edge values). The ISP-based motion detector 102 may use the pixel intensity values (or edge values, depending on the desired implementation) and a previously-captured reference frame (and/or the pixel intensity values/edge values for the reference frame) to estimate motion in the scene (determined based on a comparison of the current frame and the previously-captured reference frame). As noted previously, detecting motion from pixel information (or edge detection, change in gradient information, etc.) prior to performing demosaicing may be advantageous as pixels may be represented using fewer bits prior to demosaicing. Generally, this is because, prior to demosacing, only a single channel of color information is provided per pixel. Accordingly, any operations performed on such pixels is "cheaper" in terms of compute resources relative to processing pixels with full 3-channel (RGB) or 4-channel (RGB-IR) color information. Accordingly, such processing may be performed with lower latency while consuming less power relative to performing the same steps post demosaicing.

The modified pixel data (e.g., the modified raw pixel values and the various metadata tagging each pixel described above) may be sent to CFA interpolation (CFAI) component 714. CFAI component 714 may perform CFA interpolation (demosaicing) to generate $I_{R,G,B}$ image data for the current frame of image data so that each pixel is associated with a red pixel value, a green pixel value, and a blue pixel value (in the case of an RGB image sensor) or with a red pixel value, a green pixel value, a blue pixel value, and an infrared pixel value (in the case of an RGB-IR image sensor).

White balance (WB) component 718 and color correction component 720 may be implemented as a single component in hardware (e.g., as a single integrated circuit) or as separate components. WB component 718 may apply a per-CFA index multiplier (e.g., determined using a lookup table for each CFA index) as a gain to each pixel value. In various examples, white balancing and/or gamma correction (e.g., performed by gamma correction component 722) may be implemented by the same component (e.g., ASIC) as the color correction component 720. As previously described, red, green, and blue pixel values may be modified using a 3×3 color correction matrix of color correction component 720.

In some cases, visible light pixels (R, G, B pixels) may be saturated when IR pixels are not saturated. In such a case, subtraction of an unsaturated IR value from a saturated R, G, B pixel may result in overcompensation which produces some unnatural results (e.g., dark skies and/or black suns in outdoor images). Accordingly, in various examples, the optional IR removal component may perform a 3×3 matrix multiplication on R, G, B color pixels if such pixels are unsaturated. If pixels (and particularly green pixels which have higher and broader spectral response) are saturated, the IR component may be corrected using a secondary clip operation. Optimal clip values may be determined using statistics gathered from prior frames by analyzing regions of green pixels that are saturated.

Color correction component 720 may be a circuit (e.g., a color correction circuit) effective to apply a color correction matrix (CCM) to the color planes to correct the color space. For example, if IR is first removed (e.g., using an IR cut filter 642) the CCM may be:

$$\text{Pixel}[R \ B \ G] = \begin{bmatrix} KR_R & KB_B & KG_G \\ KB_R & KB_B & KB_G \\ KG_R & KG_B & KG_G \end{bmatrix} \cdot \begin{bmatrix} R \\ B \\ G \end{bmatrix}$$

The example CCM above is a 3×3 CCM. However, in an RGB-IR implementation the CCM may be implemented as a 4×3 matrix, instead, to account for infrared pixel information. The CCM and white balance gains may be determined using statistics related to calibration of the image sensor. Such calibration statistics may include Auto-white balance statistics, auto-exposure statistics, and auto-focus statistics. Collectively, these statistics are often referred to as "3A statistics." The 3A statistics may be stored in memory (e.g., in configuration and status registers 706) and may be used to determine the white balance gains and/or the CCM. Accordingly, the 3A statistics may be provided at various points in the image signal processing pipeline prior to WB component 718 and color correction component 720.

Gamma correction component 722 is used to correct for the differences between the way the image sensor captures information and the way that the human visual system processes light. In the image signal processor architecture 700 gamma correction may be performed using a lookup for each channel (e.g., R, G, and B) of each pixel to adjust the contrast of the image. Each color (R, G, B) may be associated with an independent gamma table that is used to lookup a gamma corrected value. In various examples, the lookup tables may be indexed by the pixel color value. The lookup tables may store the gamma corrected pixel values.

RGB to YUV component 724 may transform the RGB format data to the YUV format. In various examples, RGB to YUV component 724 may employ a 3×3 matrix multiplication followed by addition of an offset. For example:

$$Y = [R \ G \ B] \begin{bmatrix} Y_R \\ Y_G \\ Y_B \end{bmatrix} + Y_{offset};$$

$$U = [R \ G \ B] \begin{bmatrix} U_R \\ U_G \\ U_B \end{bmatrix} + U_{offset};$$

$$V = [R \ G \ B] \begin{bmatrix} V_R \\ V_G \\ V_B \end{bmatrix} + V_{offset}.$$

In various examples, the YUV format may require less bandwidth for transmission and/or storage.

Scaler 726 may be used to upscale or downscale the YUV (or RGB) data prior to converting the image data into a bit stream for writing to buffer(s) 704 (e.g., a circular buffer). In various examples, each of the luma (Y) and chroma (UV) channels may have separate configurations, to allow them to each be scaled independently. This may be important when converting from YUV444 to YUV420, as chroma is scaled to be ¼ the resolution (½ in each of the X, Y directions) of luma. Scaler 726 also provides cropping functionality such that the field of the output frame is a subset of the field of the input frame.

The scaler 726 first comprises a decimator followed by a filter. The decimator can be used to reduce the image size by 4:1, 3:1, 2:1, leave the image size unchanged, and/or change the image size by some other ratio, depending on the implementation. The image size may be changed independently in each of the horizontal (H) and vertical (V) directions.

In some examples, the decimator can be programmed to drop input pixels at the left, right, top, and bottom edges of the input image, providing for some cropping capability. Further cropping capability may be provided by the scaling function, with the added benefit of possibly more desirable edge interpolation, as the post-decimation image would not need to be edge extrapolated.

After the decimator stage, the input pixels define an annotated grid of locations, with columns (COLS) and rows (ROWS) (where COLS and ROWS is the post-decimator frame size). The scaler 726 uses the calibrated input grid and a set of configuration registers that are used to determine from where in the calibrated input grid each output pixel should be interpolated/extrapolated. The input pixels are defined to exist in the middle of each cell in the grid, thus the first input pixel is at 0.5, 0.5 in the defined grid.

Among other potential benefits, a system in accordance with the present disclosure may conserve power consumption by reducing video capture, image capture, and/or streaming from wireless camera devices resulting from insignificant motion that is unlikely to be of interest to a user. For example, detection of motion by a motion sensor of a battery-powered camera device may be used to trigger video capture by the camera device. However, as described herein, motion sensors may be triggered by insignificant motion, such as ceiling fans, pets, wind blowing various objects, passing cars, etc. Accordingly, the battery of a battery-powered camera device may be drained at an increased rate due to capture of such insignificant events. Additionally, unwanted notifications may be sent to a user of the camera system related to the insignificant motion triggers. Accordingly, as described herein, using a multi-staged approach whereby a PIR sensor detecting a motion event is used to trigger operation of a low-power ISP-based motion detector may reduce false positives and conserve battery power. Additionally, in some examples, detection of a motion event by the ISP-based motion detector may further trigger a computer vision-based object detector to determine whether an object of interest is detected within the activity zone in which motion was detected by the ISP-based motion detector. The techniques described herein may result in significantly longer battery life of wireless camera devices.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method comprising:
  generating, by an image sensor, a first frame of image data comprising a plurality of pixels;
  determining a first block comprising a first set of contiguous pixels of the plurality of pixels;

determining a respective intensity value for each pixel of the first set;

generating a first block intensity value representative of the first block by combining the respective intensity values of the pixels of the first set;

determining a comparison value representing a comparison between the first block intensity value and a second block intensity value representative of a second block associated with a reference frame of image data previously generated by the image sensor prior to generation of the first frame;

comparing the comparison value to a first threshold;

based on the comparing of the comparison value to the first threshold, generating first activity data indicating that the first block is active; and determining that motion is detected based at least in part on the first activity data indicating that the first block is active.

2. The method of claim 1, further comprising:

determining that the first block is part of a first zone comprising two or more blocks of a plurality of blocks; and determining that the comparison value is associated with the first zone.

3. The method of claim 2, further comprising:

determining a first number of blocks designated as being active in the first zone;

determining a threshold number of blocks associated with the first zone; and determining that the first number of blocks is greater than or equal to the threshold number of blocks, wherein the determining that motion is detected is further based at least in part on the first number of blocks being greater than or equal to the threshold number of blocks.

4. The method of claim 1, further comprising:

generating, for the first frame, an activity bitmap comprising respective activity data corresponding to each block of a plurality of blocks, wherein the respective activity data indicates whether a corresponding block of the plurality of blocks is active; and generating a modified activity bitmap by applying a sliding filter to the activity bitmap, wherein the sliding filter is effective to change the activity data for at least one block from active to inactive or from inactive to active, and wherein the determining that motion is detected is further based at least in part on a first number of blocks designated as active in a first activity zone of the modified activity bitmap being greater than or equal to a threshold number of blocks for the first activity zone.

5. A method comprising:

generating, based on an image sensor, first image data comprising pixel values, each pixel value being associated with a respective color tag indicating a color corresponding to a respective color filter of a color filter array;

determining a first set of the pixel values corresponding to a first block;

determining a second set of pixel values, each pixel value of the second set being determined based on a respective pixel value of the first set and the respective color tag associated with that respective pixel value;

determining, based on the second set of pixel values, a first intensity value representative of the first block;

determining a second intensity value representative of a reference block;

determining a comparison value representing a difference between the first intensity value and the second intensity value; and sending, based at least in part on the comparison value, a signal indicating detected motion.

6. The method of claim 5, wherein the first image data represents a first frame and the first block corresponds to a first portion of the first frame, and wherein the reference block corresponds to a second portion of a reference frame, the second portion of the reference frame being at a position in the reference frame that corresponds to a position of the first portion of the first frame.

7. The method of claim 5, further comprising:

determining that the first block is designated as being part of a first zone;

determining a threshold comparison value stored in memory in association with the first zone; and determining that the comparison value is greater than or equal to the threshold comparison value.

8. The method of claim 7, further comprising:

generating a bitmap of activity data representing a plurality of blocks of the first image data; and generating a first activity value for the first block in the bitmap of activity data based at least in part on the determining that the comparison value is greater than or equal to the threshold comparison value.

9. The method of claim 8, further comprising:

determining a first number of blocks designated as being part of the first zone that have the first activity value;

determining a threshold number of blocks associated with the first zone; and determining that the first number of blocks meets or exceeds the threshold number of blocks, wherein the sending the signal indicating detected motion is further based at least in part on the determining that the first number of blocks meets or exceeds the threshold number of blocks.

10. The method of claim 7, further comprising:

generating a bitmap of activity data representing a plurality of blocks of the first image data;

generating a first activity value for the first block in the bitmap of activity data based at least in part on the determining that the comparison value is greater than or equal to a threshold comparison value associated with the first zone; and applying a first sliding filter to the bitmap of activity data, wherein the first sliding filter is effective to change an activity value of a third block of the plurality of blocks from the first activity value to a second activity value based at least in part on one or more neighboring blocks of the third block.

11. The method of claim 10, wherein the first sliding filter has a width in terms of a first number of pixels and a height in terms of a second number of pixels, wherein the width is greater than the height.

12. The method of claim 10, further comprising:

determining, from the bitmap of activity data, a threshold number of blocks for the first zone;

determining a first number of blocks in the first zone having the first activity value; and determining that motion is detected in the first zone based at least in part on the first number of blocks in the first zone and the threshold number of blocks.

13. The method of claim 12, further comprising:

generating cropped image data comprising pixels of the first zone;

inputting the cropped image data into a first object detector; and determining that a first object of a predefined class is detected in the cropped image data.

14. The method of claim 5, further comprising:

determining that a passive infrared motion sensor has detected motion; and determining the comparison value based at least in part on the passive infrared motion sensor detecting motion.

15. The method of claim 5, wherein the first intensity value and the comparison value are determined by an image signal processor prior to performing color filter array interpolation for the first image data.

16. The method of claim 5, wherein each pixel value of the second set is determined based on multiplying a respective pixel value of the first set by a color channel gain value determined based on the respective color tag associated with that respective pixel value.

17. The method of claim 5, wherein each pixel value of the second set is a Laplacian or Sobel edge value calculated for a pixel location corresponding to a respective pixel value of the first set.

18. The method of claim 5, wherein each pixel value of the second set is a second order derivative value calculated for a pixel location corresponding to a respective pixel value of the first set.

19. The method of claim 5, wherein the method comprises storing the second set of pixel values as corresponding to a second reference block.

20. The method of claim 5, wherein the method comprises storing the first intensity value as corresponding to a second reference block.

21. A device comprising:

an image sensor configured to generate first image data comprising pixel values, each pixel value being associated with a respective color tag indicating a color corresponding to a respective color filter of a color filter array;

an image signal processor; and non-transitory computer-readable memory storing instructions that, when executed by the image signal processor, are effective to:

determine a first set of the pixel values corresponding to a first block;

determine a second set of pixel values, each pixel value of the second set being determined based on a respective pixel value of the first set and the respective color tag associated with that respective pixel value;

determine, based on the second set of pixel values, a first intensity value representative of the first block;

determine a second intensity value associated with representative of a reference block;

determine a comparison value representing a difference between the first intensity value and the second intensity value; and send, based at least in part on the comparison value, a signal indicating detected motion.

22. The device of claim 21, wherein the first image data represents a first frame and the first block corresponds to a first portion of the first frame, and wherein the reference block corresponds to a second portion of a reference frame, the second portion of the reference frame being at a position in the reference frame that corresponds to a position of the first portion of the first frame.

23. The device of claim 21, the non-transitory computer-readable memory storing further instructions that, when executed by the image signal processor, are further effective to:

determine that the first block is designated as being part of a first zone;

determine a threshold comparison value stored in memory in association with the first zone; and determine that the comparison value is greater than or equal to the threshold comparison value.

24. The device of claim 23, the non-transitory computer-readable memory storing further instructions that, when executed by the image signal processor, are further effective to:

generate a bitmap of activity data representing at least the first block; and generate a first activity value for the first block in the bitmap of activity data based at least in part on the determining that the comparison value is greater than or equal to the threshold comparison value.

* * * * *